United States Patent
Kommareddy et al.

(10) Patent No.: US 12,495,214 B2
(45) Date of Patent: Dec. 9, 2025

(54) PULSE ILLUMINATION IMAGING OF A TARGET ELEMENT

(71) Applicants: General Electric Company, Schenectady, NY (US); Oliver Crispin Robotics Limited, Altrincham (GB)

(72) Inventors: Vamshi Krishna Reddy Kommareddy, Bangalore (IN); Biswajit Medhi, Bangalore (IN); Andrew Crispin Graham, Badminton (GB); Walter V. Dixon, Delanson, NY (US); James Vradenburg Miller, Clifton Park, NY (US)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 350 days.

(21) Appl. No.: 18/141,493

(22) Filed: May 1, 2023

(65) Prior Publication Data
US 2024/0314447 A1 Sep. 19, 2024

(30) Foreign Application Priority Data
Mar. 15, 2023 (IN) .............................. 202311017364

(51) Int. Cl.
*H04N 23/74* (2023.01)
*H04N 23/68* (2023.01)
*H04N 23/73* (2023.01)

(52) U.S. Cl.
CPC ......... *H04N 23/74* (2023.01); *H04N 23/6812* (2023.01); *H04N 23/6845* (2023.01); *H04N 23/73* (2023.01); *H04N 23/689* (2023.01)

(58) Field of Classification Search
CPC ............... H04N 23/74; H04N 23/6812; H04N 23/6845; H04N 23/73; H04N 23/689;
(Continued)

(56) References Cited

U.S. PATENT DOCUMENTS 5,610,994 A 3/1997 Stadtfeld
6,665,441 B1 12/2003 Nishio
(Continued)

FOREIGN PATENT DOCUMENTS

CA 2362712 8/2000
CN 102944928 2/2013
(Continued)

OTHER PUBLICATIONS

Jason Geng: "Structured-light 3D surface imaging: a tutorial", Advances in Optics and Photonics, vol. 3, No. 2, Mar. 31, 2011 (Mar. 31, 2011), p. 128-160, XP055033088, DOI: 10.1364/AOP.3.000128.
(Continued)

*Primary Examiner* — Mekonnen D Dagnew
(74) *Attorney, Agent, or Firm* — Fitch, Even, Tabin & Flannery LLP

(57) ABSTRACT

A pulse illumination imaging system is provided. The system includes an image sensor, a light source, and a controller. The image sensor includes a plurality of light sensitive pixel elements that are activatable for a designated exposure time to capture one or more images. The controller is configured to determine an activation time to activate the image sensor based on motion of a target element relative to the image sensor; activate the image sensor at the activation time; and activate the light source during the exposure time of the image sensor to produce a pulse having a preconfigured time duration that is less than the exposure time of the image sensor.

20 Claims, 7 Drawing Sheets

(58) Field of Classification Search
CPC ...... H04N 23/61; H04N 25/50; H04N 23/811; H04N 25/626
See application file for complete search history.

(56) References Cited

U.S. PATENT DOCUMENTS

| | | | |
|---|---|---|---|
| 6,700,668 | B2 | 3/2004 | Mundy |
| 6,901,160 | B2 | 5/2005 | Chapman |
| 6,987,876 | B2 | 1/2006 | Silber |
| 7,427,262 | B2 | 9/2008 | Bonningue |
| 7,543,518 | B2 | 6/2009 | Buckingham |
| 7,564,626 | B2 | 7/2009 | Bendall |
| 8,069,747 | B2 | 12/2011 | Buckingham |
| 8,144,411 | B2 | 3/2012 | Yazdanfar |
| 8,194,948 | B2 | 6/2012 | Hori |
| 8,200,042 | B2 | 6/2012 | Doi |
| 8,238,642 | B2 | 8/2012 | Wu |
| 8,248,465 | B2 | 8/2012 | Doi |
| 8,285,362 | B2 | 10/2012 | Dietz |
| 8,480,563 | B2 | 7/2013 | Nakano |
| 8,493,558 | B2 | 7/2013 | Asada |
| 8,504,321 | B2 | 8/2013 | Seidel |
| 8,558,879 | B2 | 10/2013 | Doi |
| 8,562,516 | B2 | 10/2013 | Saadat |
| 8,602,722 | B2 | 12/2013 | George |
| 8,737,756 | B2 | 5/2014 | Daneshpanah |
| 8,768,046 | B2 | 7/2014 | Ernst |
| 8,913,110 | B2 | 12/2014 | Hori |
| 8,965,103 | B2 | 2/2015 | Hori |
| 9,036,142 | B2 | 5/2015 | Ahner |
| 9,046,496 | B2 | 6/2015 | Tsai |
| 9,251,582 | B2 | 2/2016 | Lim |
| 9,271,637 | B2 | 3/2016 | Farr |
| 9,275,473 | B2 | 3/2016 | Hori |
| 9,300,926 | B2 | 3/2016 | Kell |
| 9,392,230 | B2 | 7/2016 | Yokota |
| 9,412,189 | B2 | 8/2016 | Bendall |
| 9,478,393 | B2 | 10/2016 | Potocek |
| 9,652,839 | B2 | 5/2017 | Newman |
| 9,721,326 | B2 | 8/2017 | Piché |
| 9,939,386 | B2 | 4/2018 | Lewis |
| 9,984,474 | B2 | 5/2018 | Bendall |
| 10,074,169 | B2 | 9/2018 | Niedermeier |
| 10,091,432 | B2 | 10/2018 | Mukunashi |
| 10,104,313 | B2 | 10/2018 | Slavens |
| 10,126,117 | B1 | 11/2018 | Byers |
| 10,147,176 | B1 | 12/2018 | Sones |
| 10,255,519 | B2 | 4/2019 | Nagatomo |
| 10,290,113 | B2 | 5/2019 | Akagi |
| 10,488,348 | B2 | 11/2019 | Romanovsky |
| 10,504,220 | B2 | 12/2019 | Lim |
| 10,536,617 | B2 | 1/2020 | Liang |
| 10,564,111 | B2 | 2/2020 | Safai |
| 10,636,148 | B1 | 4/2020 | Chen |
| 10,699,149 | B2 | 6/2020 | Bendall |
| 10,740,913 | B2 | 8/2020 | Shi |
| 10,742,958 | B2 | 8/2020 | Yamamoto |
| 10,775,315 | B2 | 9/2020 | Mekala |
| 10,835,102 | B2 | 11/2020 | Ganapati |
| 10,909,702 | B2 | 2/2021 | Ono |
| 11,022,560 | B2 | 6/2021 | Kato |
| 11,042,017 | B2 | 6/2021 | Doi |
| 11,084,169 | B2 | 8/2021 | Graham |
| 11,116,050 | B1 | 9/2021 | Bhogal |
| 11,258,952 | B2 | 2/2022 | Kaufmann |
| 11,288,789 | B1 | 3/2022 | Chen |
| 11,410,298 | B2 | 8/2022 | Finn |
| 11,486,251 | B2 | 11/2022 | Lopez |
| 11,538,257 | B2* | 12/2022 | Rozploch ............ G06V 20/593 |
| 11,994,476 | B2 | 5/2024 | Li |
| 2001/0030744 | A1 | 10/2001 | Chang |
| 2002/0009218 | A1 | 1/2002 | Chapman |
| 2003/0234941 | A1 | 12/2003 | Mundy |
| 2005/0026710 | A1* | 2/2005 | Pao ...................... A63B 71/06 |
| | | | 473/141 |
| 2005/0234296 | A1 | 10/2005 | Saadat |
| 2005/0288555 | A1 | 12/2005 | Binmoeller |
| 2006/0033908 | A1 | 2/2006 | Draggie |
| 2006/0183977 | A1 | 8/2006 | Ishigami |
| 2007/0263904 | A1 | 11/2007 | Muramatsu |
| 2008/0240491 | A1 | 10/2008 | Hori |
| 2009/0092278 | A1 | 4/2009 | Doi |
| 2009/0167847 | A1 | 7/2009 | Doi |
| 2010/0128115 | A1 | 5/2010 | Nakano |
| 2010/0158362 | A1 | 6/2010 | Lang |
| 2011/0018987 | A1 | 1/2011 | Doi |
| 2011/0221877 | A1 | 9/2011 | Hori |
| 2012/0019653 | A1 | 1/2012 | Hori |
| 2013/0033607 | A1 | 2/2013 | Ohta |
| 2013/0093866 | A1 | 4/2013 | Ohlhues |
| 2013/0135457 | A1 | 5/2013 | Kell |
| 2013/0314530 | A1 | 11/2013 | Peterson |
| 2014/0002630 | A1 | 1/2014 | Yokota |
| 2014/0098091 | A1 | 4/2014 | Hori |
| 2014/0133697 | A1 | 5/2014 | Singamsetti |
| 2014/0163717 | A1 | 6/2014 | Das |
| 2014/0207419 | A1 | 7/2014 | Messinger |
| 2015/0168263 | A1 | 6/2015 | Mueller |
| 2015/0317816 | A1 | 11/2015 | Bendall |
| 2016/0073855 | A1 | 3/2016 | Farr |
| 2016/0221262 | A1 | 8/2016 | Das |
| 2016/0284084 | A1 | 9/2016 | Gurcan |
| 2016/0284103 | A1 | 9/2016 | Huang |
| 2017/0155832 | A1 | 6/2017 | Oshima |
| 2017/0156600 | A1 | 6/2017 | Ntziachristos |
| 2017/0318205 | A1 | 11/2017 | Duckett, III |
| 2018/0003161 | A1 | 1/2018 | Michini |
| 2018/0013959 | A1 | 1/2018 | Slavens |
| 2018/0103246 | A1 | 4/2018 | Yamamoto |
| 2018/0176470 | A1 | 6/2018 | Kim |
| 2018/0180534 | A1 | 6/2018 | Noda |
| 2019/0220968 | A1 | 7/2019 | Kato |
| 2019/0228514 | A1 | 7/2019 | Hestand |
| 2019/0260863 | A1 | 8/2019 | Takashi |
| 2019/0279380 | A1 | 9/2019 | Bendall |
| 2019/0285980 | A1 | 9/2019 | Yoshikawa |
| 2019/0328217 | A1 | 10/2019 | Moreau |
| 2019/0330997 | A1 | 10/2019 | Norton |
| 2019/0338666 | A1 | 11/2019 | Finn |
| 2019/0339165 | A1 | 11/2019 | Finn |
| 2019/0340805 | A1 | 11/2019 | Xiong |
| 2020/0056501 | A1 | 2/2020 | Eastment |
| 2020/0082526 | A1 | 3/2020 | Murphy |
| 2020/0213563 | A1 | 7/2020 | Morice |
| 2020/0319119 | A1 | 10/2020 | Peters |
| 2020/0346310 | A1 | 11/2020 | Huttner |
| 2021/0132598 | A1 | 5/2021 | Schleif |
| 2021/0239891 | A1 | 8/2021 | Moore |
| 2021/0281748 | A1 | 9/2021 | Nogami |
| 2021/0312702 | A1 | 10/2021 | Holzer |
| 2021/0396683 | A1 | 12/2021 | Zhang |
| 2022/0051395 | A1 | 2/2022 | Vandam |
| 2022/0061638 | A1 | 3/2022 | Hinding |
| 2022/0141368 | A1* | 5/2022 | Herman ................ H04N 7/181 |
| | | | 348/207.99 |
| 2022/0299645 | A1 | 9/2022 | Mitchell |
| 2022/0314430 | A1 | 10/2022 | Graham |
| 2023/0000328 | A1 | 1/2023 | Govrin |
| 2023/0016982 | A1 | 1/2023 | Graham |
| 2023/0018458 | A1 | 1/2023 | Graham |
| 2023/0018554 | A1 | 1/2023 | Graham |
| 2023/0334644 | A1 | 10/2023 | Ojima |
| 2024/0114237 | A1* | 4/2024 | Haist ...................... H04N 23/56 |
| 2024/0159711 | A1 | 5/2024 | Kommareddy |
| 2024/0163537 | A1 | 5/2024 | Kommareddy |
| 2024/0252268 | A1 | 8/2024 | Loschak |
| 2025/0080852 | A1 | 3/2025 | Kommareddy |

FOREIGN PATENT DOCUMENTS

| | | |
|---|---|---|
| CN | 104469177 | 3/2015 |
| CN | 106416225 | 2/2017 |
| CN | 106934794 | 7/2017 |
| CN | 107367899 | 11/2017 |

(56) References Cited

FOREIGN PATENT DOCUMENTS

| | | |
|---|---|---|
| CN | 108775998 | 11/2018 |
| CN | 110726633 | 1/2020 |
| CN | 111433574 | 7/2020 |
| CN | 112136154 | 12/2020 |
| CN | 112150382 | 12/2020 |
| CN | 214306123 U | 9/2021 |
| CN | 214368947 | 10/2021 |
| CN | 214965296 | 12/2021 |
| CN | 114810508 | 7/2022 |
| CN | 114979427 | 8/2022 |
| DE | 2439971 | 3/1976 |
| EP | 2170565 | 4/2010 |
| EP | 3643451 | 4/2020 |
| EP | 3643452 | 4/2020 |
| FR | 2965388 B1 | 10/2012 |
| JP | 2008014656 | 1/2008 |
| JP | 2009168499 A | 7/2009 |
| JP | 2009282379 A | 12/2009 |
| JP | 2010008394 A | 1/2010 |
| JP | 2011161019 A | 8/2011 |
| JP | 5186314 B2 | 4/2013 |
| JP | 2013059664 | 4/2013 |
| JP | 5307407 B2 | 10/2013 |
| JP | 5361246 B2 | 12/2013 |
| JP | 5390011 | 1/2014 |
| JP | 5602449 B2 | 10/2014 |
| JP | 2017040932 A | 2/2017 |
| JP | 6373322 B2 | 8/2018 |
| JP | 6810711 | 1/2021 |
| KR | 101164656 | 7/2012 |
| WO | 9807001 | 2/1998 |
| WO | 2009144729 | 12/2009 |
| WO | 2019008342 | 1/2019 |
| WO | 2020110576 | 6/2020 |
| WO | 2020219076 | 10/2020 |
| WO | 2021094534 | 5/2021 |

OTHER PUBLICATIONS

Lim Ser Nam et al: "Automatic Registration of Smooth Object Image to 3D CAD Model for Industrial Inspection Applications", 2013 International Conference on 3D Vision, IEEE, Jun. 29, 2013 (Jun. 29, 2013), pp. 79-86, XP032480418, DOI: 10.1109/3DV.2013.19.

USPTO; U.S. Appl. No. 17/985,459, Nov. 11, 2022, entitled "Inspection Systems and Methods Employing Directional Light for Enhanced Imaging".

USPTO; U.S. Appl. No. 17/985,501, filed Nov. 11, 2022, entitled "Inspection Systems and Methods Employing Different Wavelength Directional Light For Enhanced Imaging".

USPTO; U.S. Appl. No. 17/373,917; Final Rejection mailed Feb. 14, 2025; (pp. 1-23).

USPTO; U.S. Appl. No. 17/373,917; Final Rejection mailed Apr. 16, 2024; (pp. 1-22).

USPTO; U.S. Appl. No. 17/373,917; Non-Final Rejection mailed Aug. 1, 2024; (pp. 1-25).

USPTO; U.S. Appl. No. 17/373,917; Non-Final Rejection mailed Nov. 16, 2023; (pp. 1-16).

USPTO; U.S. Appl. No. 17/373,920; Final Rejection mailed Feb. 12, 2024; (pp. 1-20).

USPTO; U.S. Appl. No. 17/373,920; Final Rejection mailed Nov. 4, 2024; (pp. 1-24).

USPTO; U.S. Appl. No. 17/373,920; Non-Final Rejection mailed Feb. 11, 2025; (pp. 1-26).

USPTO; U.S. Appl. No. 17/373,920; Non-Final Rejection mailed Jun. 7, 2024; (pp. 1-20).

USPTO; U.S. Appl. No. 17/373,920; Non-Final Rejection mailed Sep. 28, 2023; (pp. 1-17).

USPTO; U.S. Appl. No. 17/373,925; Final Rejection mailed Feb. 11, 2025; (pp. 1-15).

USPTO; U.S. Appl. No. 17/373,925; Final Rejection mailed Mar. 25, 2024; (pp. 1-14).

USPTO; U.S. Appl. No. 17/373,925; Non-Final Rejection mailed Aug. 26, 2024; (pp. 1-17).

USPTO; U.S. Appl. No. 17/373,925; Non-Final Rejection mailed Nov. 14, 2023; (pp. 1-12).

USPTO; U.S. Appl. No. 17/985,459; Final Rejection mailed Jan. 15, 2025; (pp. 1-17).

USPTO; U.S. Appl. No. 17/985,459; Non-Final Rejection mailed Mar. 27, 2025; (pp. 1-17).

USPTO; U.S. Appl. No. 17/985,459; Non-Final Rejection mailed Sep. 20, 2024; (pp. 1-22).

Waygate Technologies Brochure: Everest Mentor Visual iQ+ VideoProbe; 12 pgs.; Oct. 2024; (extension://efaidnbmnn-nibpcajpcglclefindmkaj/https://dam.bakerhughes.com/m/206c48e427981e2f/original/BHCS33632B-Mentor-ViQ-Brochure_R8-pdf.pdf).

USPTO; U.S. Appl. No. 18/514,791, filed Nov. 20, 2023, entitled "Velocity Matching Imaging of a Target Element".

USPTO; U.S. Appl. No. 18/514,791; Non-Final Rejection mailed Mar. 25, 2025; (pp. 1-18).

USPTO; U.S. Appl. No. 18/514,791; Non-Final Rejection mailed Mar. 25, 2025; (pp. 1-17).

Waygate Technologies, Everest Mentor Visual iQ+ VideoProbe product specification, Jan. 2024, 12 pp.

* cited by examiner

PULSE ILLUMINATION IMAGING OF A TARGET ELEMENT

TECHNICAL FIELD

This application claims benefit of the following IN Provisional Application No. 202311017364 filed on Mar. 15, 2023, the contents of which are incorporated herein by reference in their entirety.

These teachings relate generally to motion imaging and more particularly to a pulse illumination imaging for motion capture of a target element.

BACKGROUND

Visual artifacts are anomalies apparent in visual representations such as photography. Motion blur is an artifact that results when the image being recorded moves during the recording of a single exposure. Capturing fast moving objects with a rolling shutter camera can further introduce wobble, skew, spatial aliasing, and temporal aliasing, reducing the overall clarity and accuracy of the captured images.

BRIEF DESCRIPTION OF THE DRAWINGS

Various needs are at least partially met through provision of the pulse illumination imaging system for motion capture of a target element described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
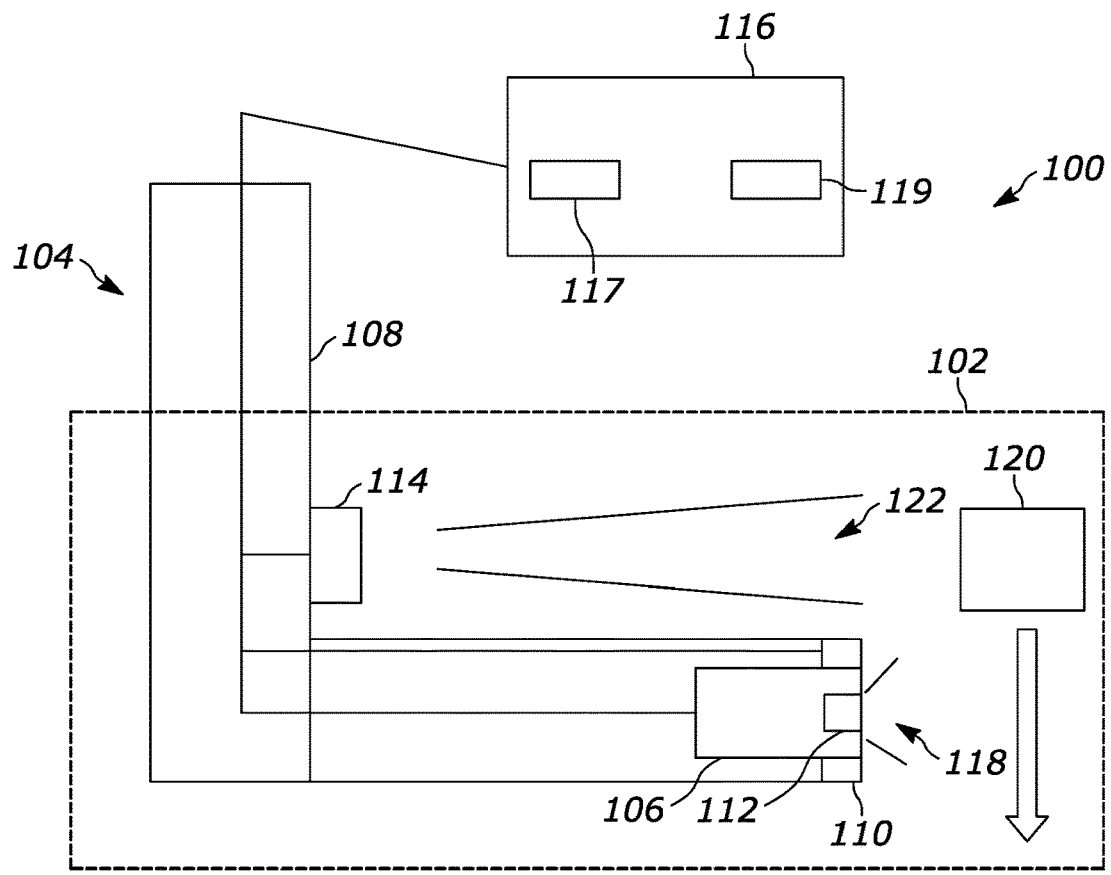
FIG. 1 shows a block diagram of an imaging system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Borescope inspection is typically done periodically to assess the distress level of components inside a fully or partially assembled aircraft engine. Imaging inspections can be done under diffused lighting with continuous illumination and are performed in motion, with either the component moving while the camera is stationary or the camera moving with respect to the component. However, the still and video images captured under these conditions can include imaging artifacts, such as motion blur or the like, introduced due to the motion of the moving elements. Imaging artifacts can be corrected using various image processing techniques, such as blind deconvolution, which characterizes the speed and angle of motion using image processing methods to estimate a point spread function for motion artifacts. Conventional techniques for artifact correction are commonly very processing intensive, take significant time to be applied, and can require layers of additional post processing to correct for other artifacts introduced after, for example, deconvolution. These are all significant challenges in the context of aviation application settings.

Generally speaking, the various aspects of the present disclosure can be employed with a system that includes an image sensor and a light source that is activated to pulse at a specific time and for a specific duration so as to produce a freeze frame effect of a rotating target element, such as a jet engine fan blade, within one or more images captured by the image sensor. The systems of the present disclosure can produce consistent images from one inspection to another irrespective of the skill level of the operator. In some embodiments, systems and methods described herein use high intensity pulse illumination with a pulse repetition frequency (PRF) of the pulse synced with a frame rate of the imaging system and the pulse width an order of magnitude smaller than the exposure time of the camera. The described method can compensate for the effect of rolling shutter and motion blur artifacts and helps in capturing images at the full resolution capability of the imaging system thus improving the clarity of captured images.

The foregoing and other benefits may become clearer upon making a thorough review and study of the following detailed description. Referring now to the drawings, and in particular to FIG. 1, an inspection system 100 that is compatible with many of these teachings and for use in inspecting a complex system 102 will now be presented. The inspection system 100 includes a borescope unit 104 having a camera 106, a guide tube 108, and a light source 110. In some embodiments, the light source 110 can be a standard light source integrated into the borescope unit 104. However, in some embodiments, the light source 110 can be separate from the borescope unit 104. The light source 110 can include, but is not limited to, various different light emitting devices, such as a light emitting diode, an array of light emitting diodes, a xenon strobe light, a laser light source, a fiberoptic light transport, other direct local light sources, other indirect remote light sources, etc.

The guide tube 108 is used to position the camera 106 and/or the light source 110 at a desired location relative to the complex system 102, for example inside the complex system 102. An end of the guide tube 108 is small and narrow and can be fed into difficult to reach locations, such as the inside of objects or mechanical devices, including jet engines or the like. When placed inside the complex system 102, the camera 106 then relays image data captured thereby back to an eyepiece and/or a display where the inside of the complex system 102 can be viewed and magnified. In some embodiments, the light source 110 can be mounted on the guide tube 108 to be brought into position with respect to a target element 120 of the complex system 102.

In some embodiments, the borescope unit 104 can be replaced with a snake-arm robot, such as any of those disclosed in U.S. Pat. Nos. 8,069,747B2, 7,543,518B2, 11,084,169B2 and European Patents EP2170565B1, EP3643451A1, EP3643452A1, each of which is incorporated by reference in their entirety. Snake-arm robots, like borescopes, can be used for inspection of confined spaces. Snake-arm robots are electro-mechanical devices that include an arm with high degrees of freedom that can be controlled in a snake-like manner to follow a contoured path and avoid obstacles or comply when contacting obstacles. A snake arm robot typically includes a sequence of links that are driven by one or more motors and can move relative to one another to change the shape or curvature of the extension arm. In some embodiments, the inspection system 100 may include a rigid or flexible elongated extension element that is sized and shaped to insert the camera 106 and the light source 110 into a confined space, such as the interior of a jet engine, to perform inspection. It will also be appreciated that the light source 110 can be deployed in conjunction with non-confined space vision systems used to identify surface anomalies on an accessible portion of an object, for example, in a photo studio setting or the like.

The inspection system 100 includes a sensor 114 and a controller 116 that is electrically coupled to the sensor 114, the camera 106, and the light source 110. The camera 106 is supported inside the guide tube 108 and includes an image sensor 112 with a field of view 118 for capturing one or more images of the target element 120 inside the complex system 102. The camera 106 can also include other optical elements, such as lenses and the like, that together with the image sensor 112 form an optical system with a resolution with respect to static (e.g. non-moving objects) that is defined in terms of line pairs per millimeter (lp/mm). In particular, lp/mm refers to an ability of the optical system to fully distinguish between a number of separately delineated same-sized black and white pairs of lines (i.e., the line pairs) presented in a specific spatial region a certain mm in length. As seen in FIG. 1, the controller 116 can include a programmable processor 117 and a memory 119. The processor 117 may include, for example, a microprocessor, a system-on-a-chip, an application specific integrated circuit (ASIC), and/or a field programmable gate array (FPGA). The memory 119 may include, for example, an electrical charge-based storage media such as EEPROM or RAM, or other non-transitory computer readable media.

Where the complex system 102 includes a jet engine or the like, the target element 120 can include one or more fan blades, compressor blades, turbine blades, or stator airfoils, such as nozzles and guide vanes, of the jet engine and/or other elements of the engine. Furthermore, the sensor 114 includes a sensing region 122 in which the sensor 114 detects movement of the target element 120 relative to the sensor 114, for example relative movement of a fan blade or shaft encoder to detect fan blade presence in multiple stages. In some embodiments, the sensor 114 can be used to detect movement of another portion of the complex system 102 that is linked to the target element 120, for example a shaft or rotor of a jet engine. The sensor 114 can be coupled to the guide tube 108 for insertion into the complex system 102 along with the borescope unit 104. Additionally or alternatively, the sensor 114 can be a standalone device that is separately positionable relative to the complex system 102 proximate to the target element 120. The sensor 114 can include, but is not limited to, various contact and non-contact motion sensing devices, such as a whisker or electrical continuity sensor or switch, a roller type switch, an inductive proximity sensor, an optical proximity sensor, a hall effect sensor, an electrical continuity sensor, an ultrasonic sensor, etc. Where the sensor 114 is a contact sensor, such as a switch, the sensing region 122 can include a region in which the contact sensor physically traverses. In some embodiments, where the sensor 114 is triggered off of a rotor or shaft of the complex system 102, the sensor 114 can include a roller located on the shaft or rotor, a motion flow sensor such as in an optical or laser mouse, a gyroscope or inertial measurement unit (IMU) attached to the shaft or rotor, a pull thread temporarily attached to the shaft or rotor, or other similar devices.

Figure 2:
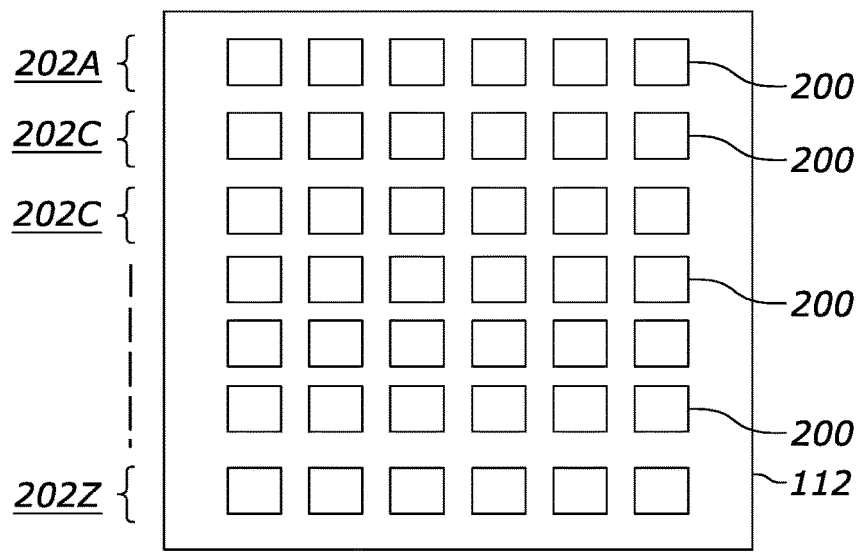
FIG. 2 shows a schematic diagram of an image sensor as configured in accordance with various embodiments of these teachings.

With reference now to FIG. 2, the image sensor 112 includes a plurality of light sensitive pixel elements 200 that are activatable. The plurality of light sensitive pixel elements 200 can be arranged in discrete rows 202A, 202B, 202C, 202Z, etc. as shown in FIG. 2. In some embodiments, the plurality of light sensitive pixel elements 200 are activatable by discrete row for a designated exposure time 300 (FIG. 3) and on a rolling basis. In particular, when activated, each one of the activated light sensitive pixel elements 200 generates a digital signal representative of light viewable by that pixel element when active. Then, the camera 106 and/or the controller 116 can convert those digital signals into image data that is viewable on a display device by an operator of the inspection system 100. In some embodiments, the controller 116 can determine an activation time for the image sensor 112 (e.g., the time when the light sensitive pixel elements 200 are activated for the exposure time 300) based on motion of the target element 120 relative to the image sensor 112. Furthermore, the controller 116 can be configured to activate the image sensor 112 at the activation time.

It will be appreciated that the relative motion of the image sensor 112 and the target element 120 encompasses any of movement of the target element 120 relative to a stationary image sensor 112, movement of the image sensor 112 relative to a stationary target element 120, and simultaneous movement of both the image sensor 112 and the target element 120 relative to each other. The relative movement includes lateral movement, transverse movement, movement in/out of a plane of view, and any combination thereof. Furthermore, where utilized, the sensor 114 can be located such that the sensor 114 moves synchronously with either the image sensor 112 or the target element 120. However, in some embodiments, the sensor 114 may be stationary while both the image sensor 112 and the target element 120 are in motion.

Figure 3:
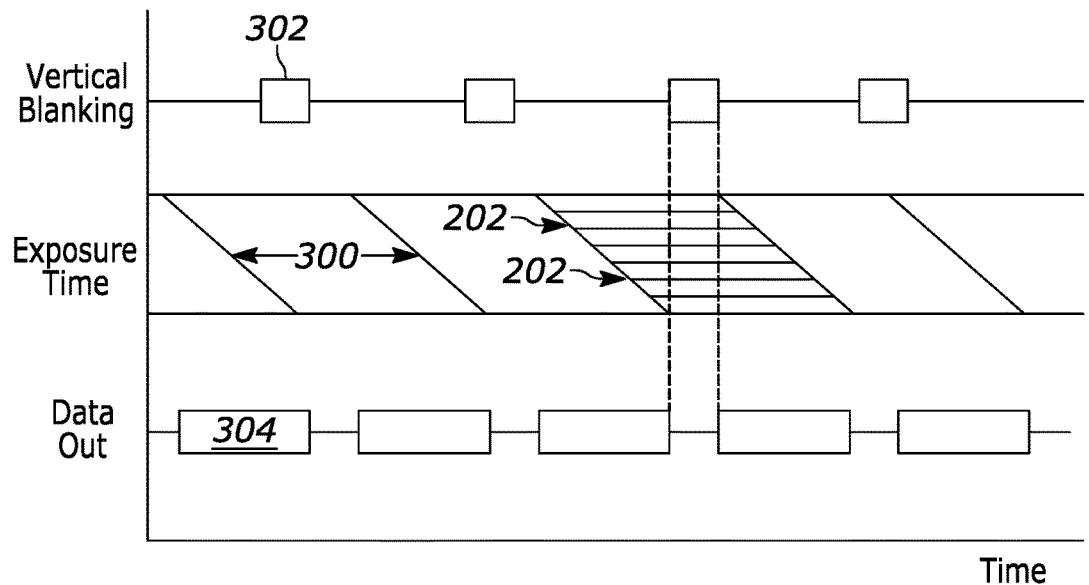
FIG. 3 shows a timing diagram for pulse illumination and image capture as configured in accordance with various embodiments of these teachings.

With reference to FIGS. 1, 2, 3, and 4, operation of the camera 106, the image sensor 112, and the light source 110 will be discussed in more detail. As seen in FIG. 3, the light sensitive pixel elements 200 are activated for the exposure time 300. Furthermore, FIG. 3 shows the rolling activation of the discrete rows 202 whereby a topmost row (e.g., discrete row 202A of FIG. 2) is activated first in time with each row continuing to activate in sequence at an offset time from the prior row until the last row (e.g., discrete row 202Z of FIG. 2) is activated. While activation of each of the discrete rows 202 is staggered, every one of the discrete rows 202 will be active to simultaneously capture light sensitivity data from the field of view 118 during a vertical blanking time 302. In some embodiments, multiple ones of the discrete rows 202 can be grouped for simultaneous activation. In these embodiments, the different groupings of the discrete rows 202 can be activated on a rolling staggered basis similar to that described above.

Figure 4:
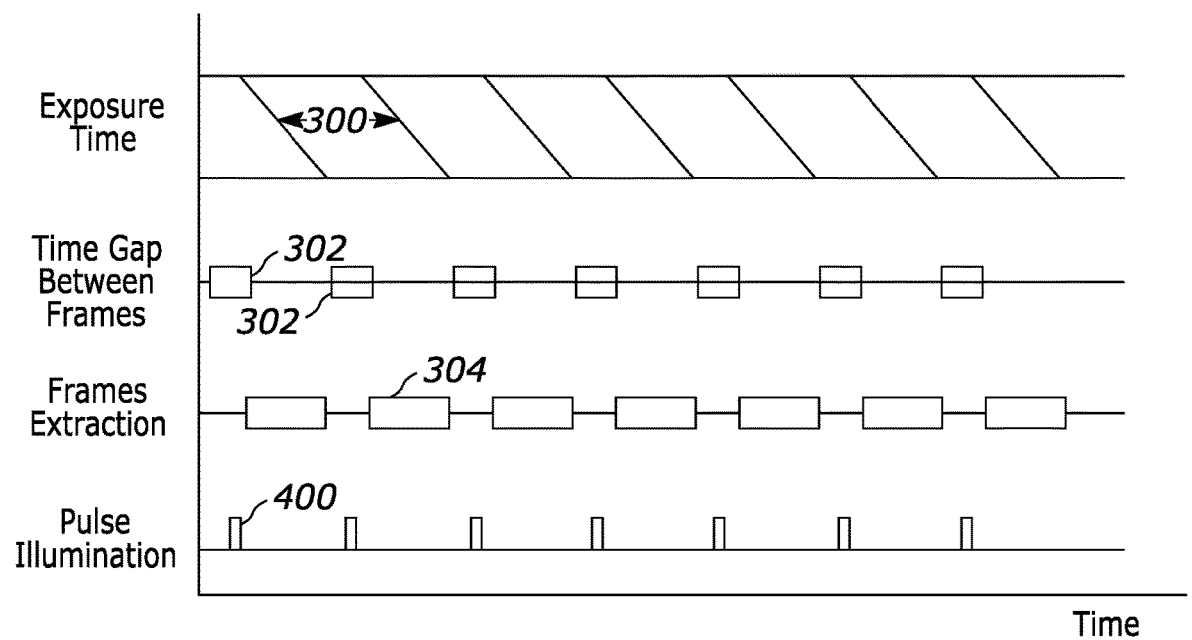
FIG. 4 shows a timing diagram for pulse illumination and image capture as configured in accordance with various embodiments of these teachings.

After the vertical blanking time 302 and the complete exposure of the top one of the discrete rows 202, the camera 106 and/or the controller 116 initiates a read-out period 304 for the captured light sensitivity data. Specifically, during the read-out period 304, the light sensitivity data is transferred from the image sensor 112 into a non-volatile memory for storage and later recall. Each block of the designated exposure time 300 and subsequent read-out period 304 correspond to a single captured image of the field of view 118. Furthermore, as seen in FIG. 4 the exposure time 300 and the subsequent read-out period 304 can be repeated at a periodic frame rate to generate a sequence of images that are combinable into a video. In such embodiments, the vertical blanking time 302 corresponds to a time gap period between each of the video frames, and the periodic frame rate corresponds to the activation time for the image sensor 112.

In some embodiments, activation of the light source 110 can include a single or repetitive periodic pulse 400 that has a timing synced to the start of the readout period 304 and that is activated for a preconfigured time duration that is less than the exposure time 300. For example, as seen in FIG. 4, the repetitive periodic pulse 400 can have a Pulse Repetition Frequency (PRF) that is synchronized to occur entirely during the vertical blanking time 302 before the rolling readout of the light sensitive pixel elements 200. This timing can ensure that the target element 120 is captured entirely within a single one of the one or more images captured by the camera 106 because the light from the light source 110 will be emitted solely when all of the discrete rows 202 are active. In some embodiments, the PRF can be synchronized to occur at least partially outside of the vertical blanking time 302. In these embodiments, the target element 120 will be frozen in different adjacent ones of the one or more images because of the rolling exposure and read-out of the light sensitive pixel elements 200. Therefore, these adjacent ones of the one or more images can be combined to generate a single composite image of the target element 120. It will also be appreciated that the pulse activation of the light source 110 can be operated in connection with a non-rolling global shutter to reduce motion blur from the relative motion of the target element 120. For such global shutter variants of the camera 106, each of the light sensitive pixel elements 200 are simultaneously read out. As such, no rolling shutter distortion is introduced in addition to motion blur caused by the relative movement of the target element 120.

In some embodiments, the pulse width (e.g., the preconfigured time duration the light source 110 is activated) is an order of magnitude smaller than the designated exposure time 300. For example, in some embodiments the exposure time 300 is 8 milliseconds and the pulse width is 0.8 milliseconds. The difference in time magnitude enables the repetitive periodic pulse 400 to produce a global shutter like effect on the image sensor 112 to ensure that the motion of the target element 120 is frozen within the one or more images (e.g. motion blur is controlled or eliminated). It will be appreciated that different values or ranges of values for the exposure time 300 and the duration of the pulse width are available. For example, the exposure time 300 can be in a range of between 4 milliseconds and 64 milliseconds and the time duration for the pulse width can be in a range of between 0.1 milliseconds and 4 milliseconds. In some embodiments, the exposure time 300 is in a range of between 4 milliseconds and 8 milliseconds and the time duration for the pulse width is in a range of between 0.25 milliseconds and 2.5 milliseconds.

The repetitive periodic pulse 400 acts as a global shutter because the ambient conditions relative to the target element 120 are dark or otherwise have de minimis visibility within the data recorded by the image sensor 112 absent light provided by a light source, such as the light source 110. As such, using the repetitive periodic pulse 400 can effectively lower the exposure time 300 without need to modify the time duration for which each of the light sensitive pixel elements 200 are active. This modification is useful where a speed of the relative motion of the target element 120 exceeds a maximum speed that can be frozen at either a hardware or resolution-limited minimum exposure time of the image sensor 112. The hardware-limited exposure time corresponds to the smallest possible value for the exposure time 300 that the image sensor 112 is capable of delivering, and the resolution-limited minimum exposure time corresponds to the smallest value for the exposure time 300 that the image sensor 112 can capture sufficient light to effectively generate images of the target element 120.

Furthermore, the duration of the pulse width can be a function of a minimum resolution of the camera given a specific working distance under static (e.g. non-moving) conditions, and the speed of the relative motion between the image sensor 112 and the target element 120. In particular, the time value of the pulse width can be varied to ensure that the static resolution of the camera 106 is maintained under the relative motion conditions. For example, the maximum duration for the pulse width (PW-MAX) in milliseconds that replicates the static resolution of the camera 106 at a specified working distance and minimum exposure time is defined by Equation 1 presented below, where R-CAM is the static resolution at the specific working distance in lp/mm and TS is the transverse speed of the target element 120 relative to the camera 106 in mm/s.

$$PW\text{-MAX} = \frac{1000}{2*R\text{-}CAM*TS} \qquad \text{Equation 1}$$

As discussed above, the repetitive periodic pulse 400 acts as a global shutter to freeze a frame that acts analogous to lowering the exposure time 300 of the image sensor 112 from the hardware- or resolution-limited minimum exposure time. The advantage of this approach can be seen with reference to Table 1 and Table 2 below with respect to an example image sensor at a working distance of 30 mm and with a minimum exposure time of 4 ms. Specifically, Table 1 shows the final moving object resolution of an image in lp/mm for a continuous illumination over the 4 ms exposure time for different relative speeds for the target element 120 and Table 2 shows the final moving object resolution of an image in lp/mm for illumination under different pulse width durations and different relative speeds for the target element 120. As seen in Tables 1 and 2, the final moving object resolution is the lesser of the static resolution of the camera (e.g. 10 lp/mm) or the minimum resolution induced by motion blur. The minimum resolution (R-MIN) induced by motion blur in lp/mm is in turn defined by Equation 2 below, where TS is the relative speed of the target element 120 (e.g. the transverse speed) in mm/s and EET is the effective exposure time in ms (e.g., the exposure time of 4 ms for Table 1 or the pulse width time for Table 2).

$$R\text{-MIN} = \frac{1000}{2*TS*EET} \qquad \text{Equation 2}$$

With reference to Table 1, it can be seen that under continuous illumination the maximum possible relative speed achievable for the target element 120 without producing image degradation as compared with the static resolution of the camera 106 configured as Complementary metal-oxide-semiconductor (CMOS) rolling output optical system under continuous illumination is 12.5 mm/s (e.g. at a relative movement of 12.5 mm/s R-MIN is equal to the static resolution of the camera). Specifically, the speeds of 16 and 20 mm/s in cases 5 and 6 result in a minimum resolution less than the static resolution of 10 lp/mm. In contrast and with reference to Table 2, utilizing the pulse width time as calculated according to Equation 1 above can enable non-degraded image capture of the target element 120 at increased relative speeds including but not limited to 20, 50, 66.66, 100, and 200 mm/s. With specific reference to case 11 of Table 2, it is shown that employing a pulse width duration of at most 2.5 ms for a transverse speed of 20 mm/s can restore the full static resolution of the camera that would otherwise be degraded under a similar speed under constant illumination over the exposure time as seen in case 6 of Table 1.

TABLE 2

TABLE 2 - Pulse Width Illumination Independent of Camera Exposure Time (at 4 ms)

|  | Case 7 | Case 8 | Case 9 | Case 10 | Case 11 |
| --- | --- | --- | --- | --- | --- |
| Pulse Width (ms) | 0.25 | 0.50 | 0.75 | 1.00 | 2.50 |
| Transverse Speed (mm/s) | 200.00 | 100.00 | 66.66 | 50.00 | 20.00 |
| Min resolution of the image due to motion blur (lp/mm) | 10.00 | 10.00 | 10.00 | 10.00 | 10.00 |
| Resolution of Image of a moving object at 30 mm (lp/mm) | 10.00 | 10.00 | 10.00 | 10.00 | 10.00 |

It will be understood that cameras having different minimal resolutions and working distances from the example of 10 lp/mm at a 30 mm working distance may also be utilized. In particular, Table 3, presented below, shows the static resolution at working distances of 20, 30, and 40 mm of three different camera systems, namely a 90 degree Field of view borescopic system, a 93 degree Field of view 2 megapixel CMOS system, and a 29 degree Field of view system. As seen below, the 90 degree Field of view borescopic system and the 93 degree Field of view 2 megapixel CMOS system both produce a best minimum resolution of 11.2 lp/mm at a working distance of 20 mm, while the 29 degree Field of view CMOS system produces a best minimum resolution of 22.5 lp/mm at a working distance of 30 mm. For each of these possible systems and other similar camera imaging systems known in the art, Equation 1 above can be utilized to calculate the maximum pulse width duration needed to maintain the camera's static resolution when capturing images of the target element 120 under relative motion that is in excess of the maximum speed capturable by that camera at the hardware- or resolution-limited minimum exposure time.

TABLE 3

| | Resolution (lp/mm) | | |
| --- | --- | --- | --- |
| Distance (mm) | 90 Deg FOV Borescopic | 93 Deg FOV 2MP CMOS | 29 Deg FOV 2MP CMOS |
| 20 | 11.2 | 11.2 | 5 |
| 30 | 9 | 9 | 22.5 |
| 40 | 7.1 | 7.1 | 5 |

In some embodiments, the amount of illumination in lux output by the light source 110 can be varied, by the con-

TABLE 1

TABLE 1 - Continuous Illumination over entire Exposure Time

Figure 5:
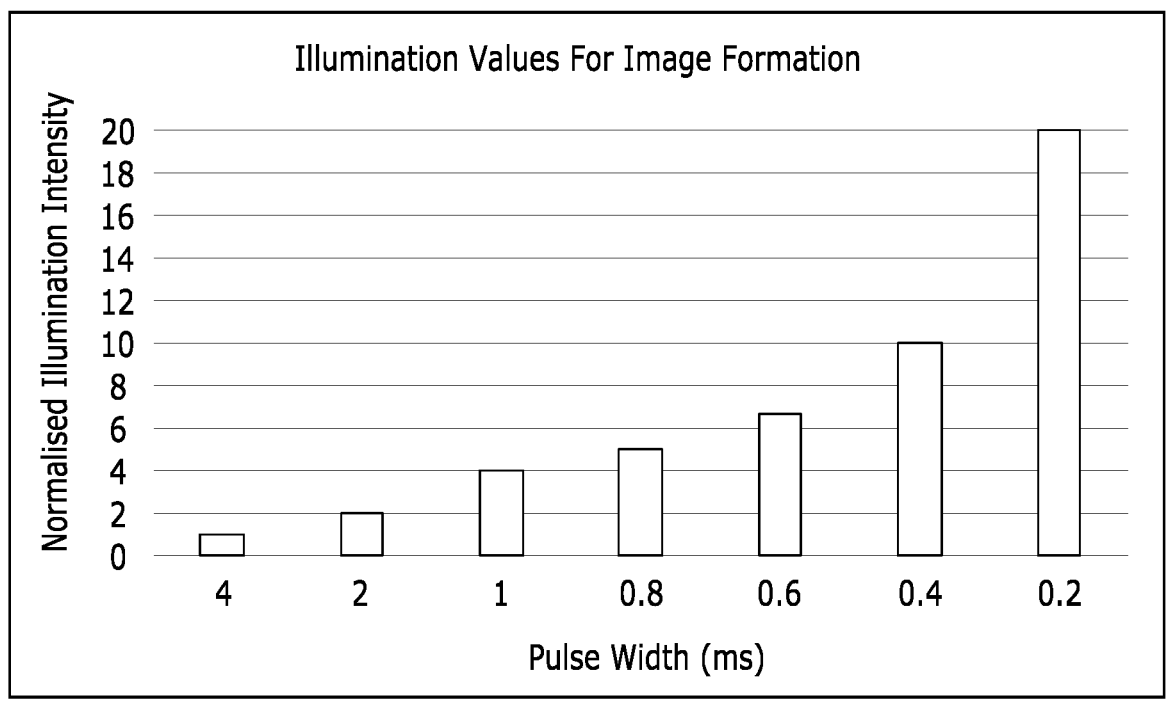
FIG. 5 shows a graph of normalized illumination values in accordance with various embodiments of these teachings.

| | Case 1 | Case 2 | Case 3 | Case 4 | Case 5 | Case 6 |
| --- | --- | --- | --- | --- | --- | --- |
| Min Camera Exposure Time (ms) | 4.00 | 4.00 | 4.00 | 4.00 | 4.00 | 4.00 |
| Transverse Speed (mm/s) | 1.00 | 4.00 | 8.00 | 12.50 | 16.00 | 20.00 |
| Min resolution induced due to motion blur (lp/mm) | 125.00 | 31.25 | 15.63 | 10.00 | 7.81 | 6.25 |
| Resolution of Image of a moving object at 30 mm (lp/mm) | 10.00 | 10.00 | 10.00 | 10.00 | 7.81 | 6.25 | troller 116, as a function of the pulse width duration to ensure minimum quality in the image data. Table 4 below shows example minimum illumination values that will produce reference quality images at different pulse width durations. In particular, Table 4 shows the variation in lux that maintains image quality relative to a specific continuous illumination value at the hardware- or resolution-limited minimum exposure time (e.g. 700 lux at 4 ms for the example shown in Table 4). This relationship is defined by the normalized resolution factor comparing the pulse width duration to the hardware- or resolution-limited minimum exposure time (e.g. the minimum exposure time divided by the pulse width duration) as identified in Table 4 below. It will be appreciated that other camera and imagining systems can have different ideal continuous illumination values and hardware- or resolution-limited minimum exposure times. As such, the output illumination (L-OUT) for a specific pulse width duration can be defined generally by Equation 3 presented below, where L-CON is the continuous illumination in lux that produces ideal images at the hardware- or resolution-limited minimum exposure time (ET-MIN) and PWD is the desired pulse width duration. This relationship can also be seen with respect to FIG. 5.

TABLE 4

| Illumination (lux) | Pulse duration (s) | lux-sec | Pulse duration (ms) | Normalized-illumination factor |
|---|---|---|---|---|
| 700 | 0.004 | 2.8 | 4 | 1 |
| 1400 | 0.002 | 2.8 | 2 | 2 |
| 2800 | 0.001 | 2.8 | 1 | 4 |
| 3500 | 0.0008 | 2.8 | 0.8 | 5 |
| 4666.666667 | 0.0006 | 2.8 | 0.6 | 6.67 |
| 7000 | 0.0004 | 2.8 | 0.4 | 10 |
| 14000 | 0.0002 | 2.8 | 0.2 | 20 |

$$L\text{-OUT} = \frac{L\text{-CON} * ET\text{-MIN}}{PWD} \qquad \text{Equation 3}$$

It will also be appreciated that in some embodiments, the light source 110 can be configured to output for all pulse width durations a single illumination value corresponding to a minimum pulse width duration of the inspection system 100. For example, in the context of Table 4 above, the light source 110 can be configured to always output light with a luminance of 14000 lux. It will further be appreciated that in some embodiments, the image sensor 112 and the light source 110 can utilize the non-visible light spectrum (e.g., ultraviolet or infrared light) rather than visible light. Using non-visible light can enable use of the inspection system 100 on target elements where the ambient lighting conditions would result in non-de minimis light being captured by the image sensor 112 outside of when the repetitive periodic pulse 400 is active. Additionally or alternatively, in some embodiments, the ambient lighting conditions that would result in non-de minimis light being captured by the image sensor 112 can be corrected for by placing filters or other similar light blocking mechanisms on the camera 106. For example, Neutral Density (ND) Filters can be added to the camera 106 to minimize the number of photons that reach the image sensor 112. Furthermore, in these embodiments, the intensity of the pulse illumination is increased to correct or offset for the presence of ND filters in the imaging path so as to enable generating a good signal to noise ratio in images formed from the light that reaches the image sensor 112.

In general, activation of the light source 110 is accomplished by the controller 116. In particular, the controller 116 can synchronize the activation of the light source 110 with the activation time of the image sensor 112 and with the movement of the target element 120. In some embodiments, the synchronization is accomplished using a trigger signal or condition such as a detection signal that is sent or transmitted from the sensor 114, is received at the controller 116, and indicates the presence of movement within the sensing region 122. As such the detection signal can detect a position of a fan blade, sync the activation of the light source with the frame rate of the camera 106, and trigger activation of the light source 110 at short pulses.

Figure 6:
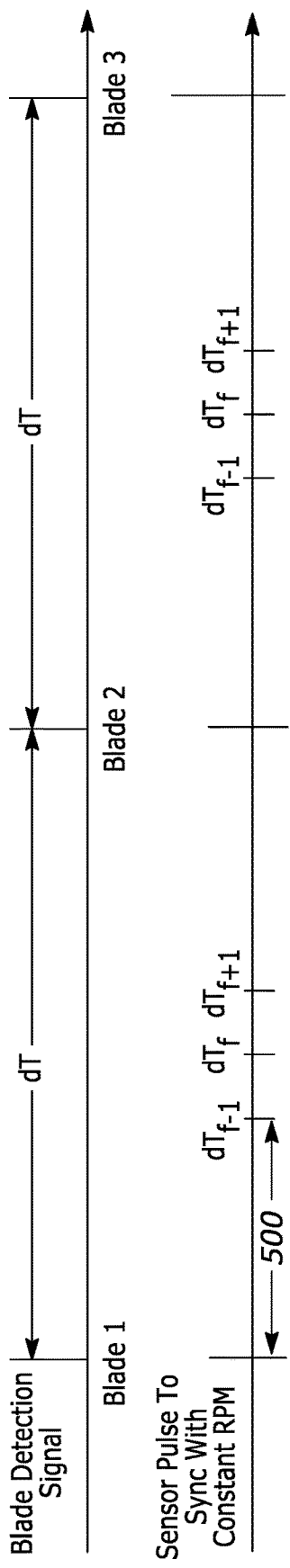
FIG. 6 shows a timing diagram for pulse illumination and image capture as configured in accordance with various embodiments of these teachings.
Figure 7:
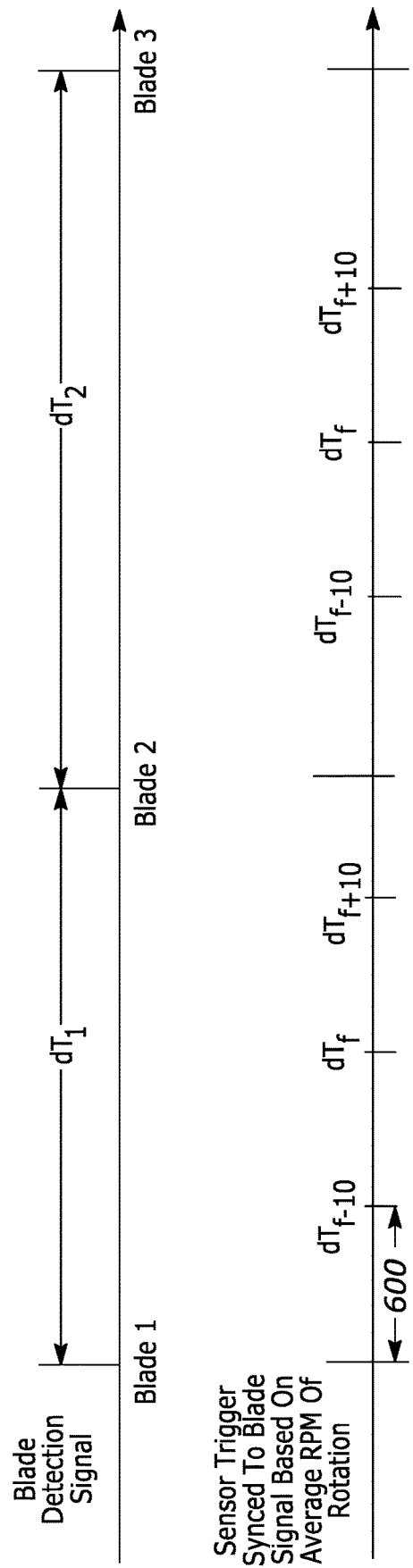
FIG. 7 shows a timing diagram for pulse illumination and image capture as configured in accordance with various embodiments of these teachings.

In some embodiments, the controller 116 utilizes a time delay as measured from receipt of the detection signal to synchronize the activation of the light source 110 with the activation of the image sensor 112. For example, as seen in FIG. 6, where the target element 120 is being moved through the sensing region 122 at a constant RPM (e.g., by use of a precise turning tool) a time delay 500 from receipt of the detection signal to a time for a frame ($dT_{f-1}$) one frame before a key frame ($dT_f$) that includes the target element 120 is set based on the constant revolutions per minute associated with the target element 120. Furthermore, the image sensor 112 can be activated until a frame ($dT_{f-1}$) one frame after the key frame (dTr). However, as seen in FIG. 7, where the target element 120 is being moved through the sensing region 122 at a non-constant RPM (e.g. by a turning tool with a varying turning tool speed) a time delay 600 from receipt of the detection signal to a time for a frame ($dT_{f-10}$) ten frames before the key frame ($dT_f$) is set based on an on average revolutions per minute associated with the target element 120. In some embodiments, the number of frames captured before the key frame ($dT_f$) (e.g., $dT_{f-1}$, $dT_{f-10}$, etc.) is determined as a function of an observed standard deviation in the relative motion between the image sensor 113 and the target element 120 and, thus, is not limited to the examples of 1 and 10 frames discussed above. In some embodiments, the controller 116 determines the average revolutions per minute from repeated receptions of the detection signal. The time delays 500 and 600 can be determined using time and/or distance synchronization. In particular, time synchronization can include utilizing a known travel time between a location of the sensor 114 and the field of view 118 and distance synchronization can include utilizing a known distance between a location of the sensor 114 and the field of view 118.

It will be understood that the movement detected by the sensor 114 can be the movement of the target element 120 that is captured in the one or more images or movement of another element associated with the target element 120. For example, where the target element 120 is part of a group of moving elements that move through the sensing region 122 on a repeating and periodic basis, the movement that initiates the blade detection signal can be movement of a preceding or succeeding element in the group. Specifically, where the target element 120 includes a fan blade of a jet engine, a trigger for the controller to activate the image sensor 112 and capture the one or more images of that specific fan blade can be the presence of another of the fan blades within the sensing region 122. Furthermore, as described in more detail herein, the motion detected by the sensor 114 can be motion of the shaft or rotor of the engine.

Figure 8:
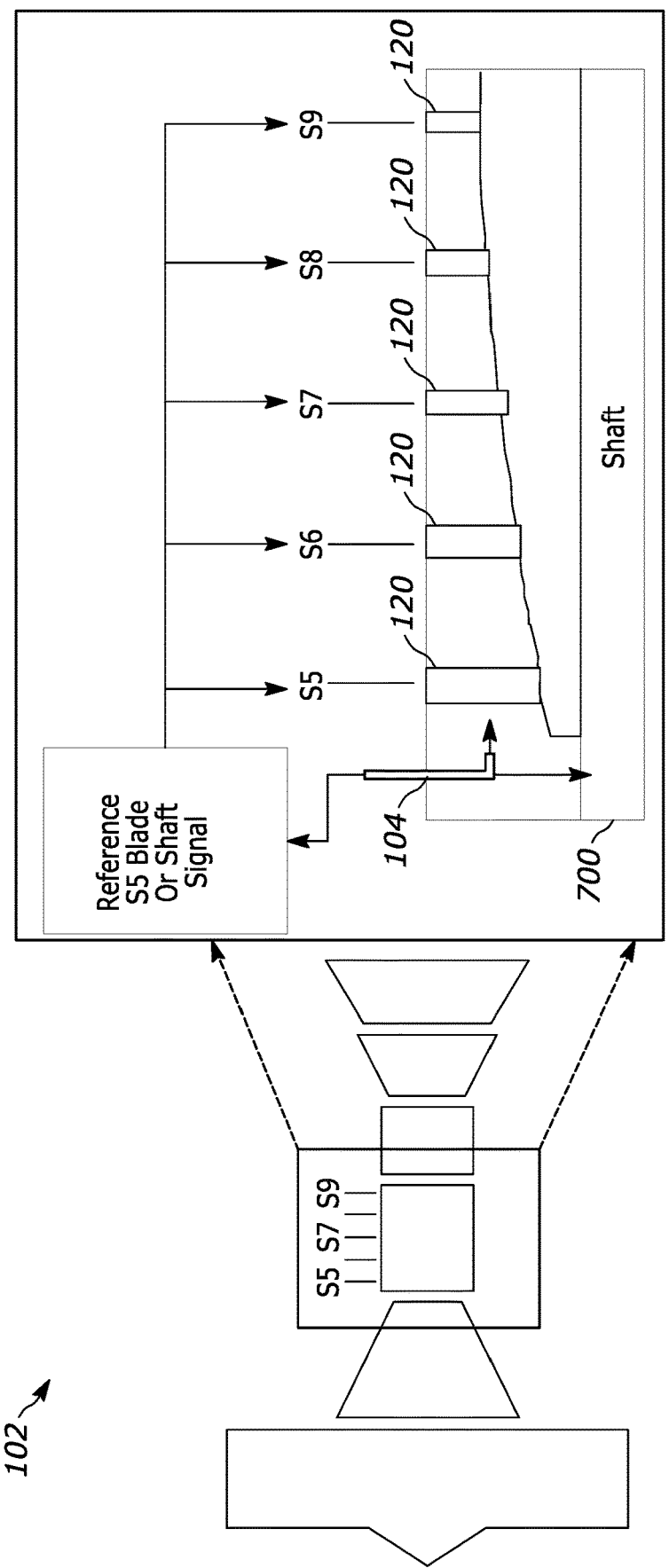
FIG. 8 is a schematic diagram of an imaging system in conjunction with a multistage jet engine as configured in accordance with various embodiments of these teachings.

In some embodiments, where the target element 120 includes elements from within multiple stages of an engine, such as the stage of fan blades and multiple stages of other elements and airfoils (e.g. stator airfoils, rotor airfoils, compressor vanes, compressor blades, turbine blades, turbine buckets, turbine vanes, etc.), the sensor 114 is configured to detect movement relative to a single common reference point for each of the multiple stages. For example, as seen in FIG. 8, the single common reference point can include a shaft 700 of the engine or the movement of blades within one stage (e.g., stage S5 of stages S5, S6, S7, S8, S9, etc.). In these embodiments, illumination and imaging of each stage can be done simultaneously via multiple borescope units 104 and using a known clocking of each of the stages. Furthermore, in some embodiments, alternating ones of the stages can be imaged at the same time to avoid light bleed between adjoining ones of the stages.

In some embodiments, the sensor 114 can be omitted. In these embodiments, synchronization of the repetitive periodic pulse 400 with activation of the image sensor 112 and the movement of the target element 120 can be accomplished using a known repeating and periodic movement relative to the field of view, and the activation of the light source 110 is initiated based on a known frequency and duration of the repeating periodic motion of the target element 120 (e.g., a known clocking rate of the target element 120). Furthermore, in embodiments where the exact clocking rate of the target element 120 is not known and the sensor 114 is also omitted, the synchronization of the repetitive periodic pulse 400 with activation of the image sensor 112 and the movement of the target element 120 can be accomplished using the image sensor 112 and a time delay calibration method.

Figure 9:
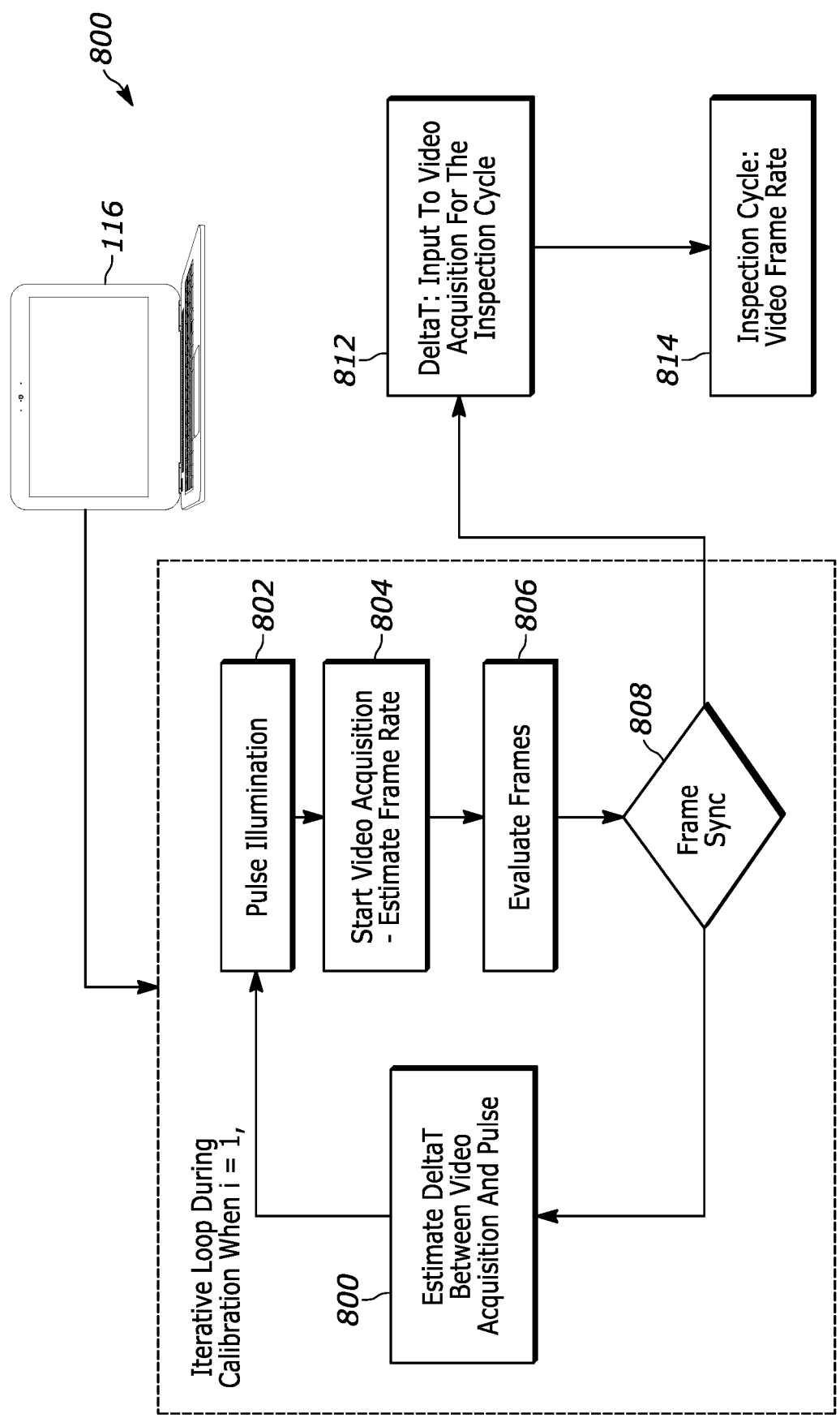
FIG. 9 shows a flow diagram for a calibration method as configured in accordance with various embodiments of these teachings.

FIG. 9 is a flow diagram of an embodiment of the time delay calibration method 800. The method 800 can include activating 802, after a time delay, the light source 110 to emit pulsed illuminations that illuminate the field of view 118 of the image sensor 112 for a preconfigured time duration. Further, the time delay calibration method 800 includes initiating 804 repeated activation of the plurality of light sensitive pixel elements 200 for the designated exposure time 300, in the discrete rows 202, and on the rolling basis to capture light sensitivity data from the field of view 118 so as to capture the plurality of video frames. In some embodiments the imitating 804 can include estimating a frame rate of the image sensor 112. Next, the method 800 includes evaluating 806 the plurality of video frames for determining 808 whether the activating 802 of the light source 110 was synchronized with the plurality of video frames. When the activating 802 of the light source 110 is not synchronized, the method 800 includes identifying or estimating 810 a proximate delay (e.g., a deltaT) between the capture of the plurality of video frames and the activating 802 of the light source 110 and updating the time delay based on the proximate delay, and continuing the activating 802, initiating 804, evaluating 806, determining 808, and estimating 810 until the light source 110 is synchronized with the plurality of video frames. When the activating 802 of the light source 110 is determined to be synchronized, saving 812 a current value of the time delay as a calibrated time delay value for use in a normal inspection cycle operation 814 of the inspection system (e.g. as an input to video acquisition for an inspection cycle).

Figure 10:
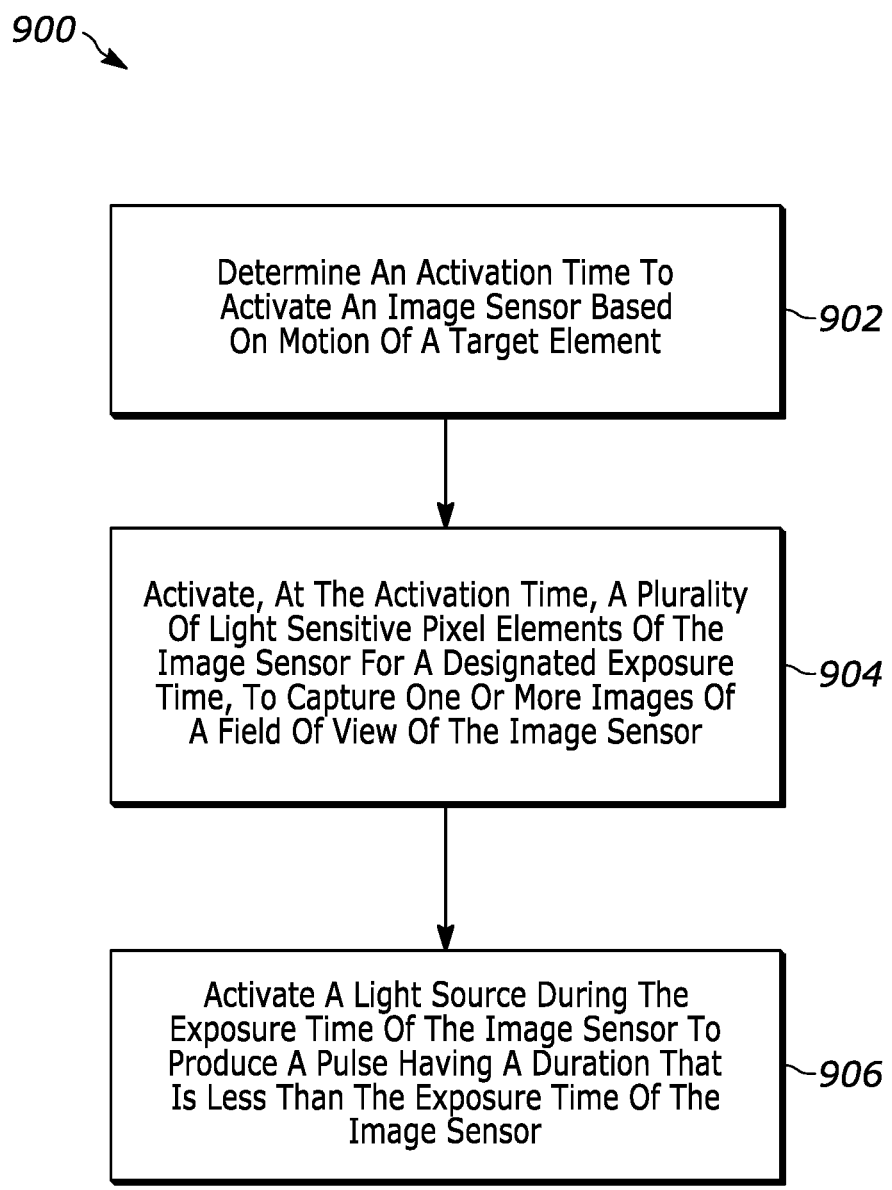
FIG. 10 shows a flow diagram for an operating method as configured in accordance with various embodiments of these teachings.

In general, a normal operating method 900 of the inspection system 100 is shown in FIG. 10. The method 900 includes determining 902 the activation time to activate the image sensor 112 based on motion of the target element 120. The method 900 also includes activating 904, at the activation time, the plurality of light sensitive pixel elements 200 of the image sensor 112 for the designated exposure time 300, in the discrete rows 202, and on a rolling basis to capture one or more images of the field of view 118 of the image sensor 112. The method 900 also includes activating 906 the light source 110 during the exposure time 300 of the image sensor 112 to produce a pulse having a duration that is less than the exposure time 300 of the image sensor 112. As described in more detail above, in some embodiments, the activating 906 can be synchronized to the activating 904 of the image sensor 112 and with the movement of the target element 120 via a time delay such as the calibrated time delay value from the method 800 or the time delays values 500 and 600 from receipt of the detection signal from the sensor 114.

Further aspects of the disclosure are provided by the subject matter of the following clauses:

A pulse illumination imaging system comprising: an image sensor having a plurality of light sensitive pixel elements that are activatable, for a designated exposure time to capture one or more images of a field of view of the image sensor; a light source; and a controller configured to: determine an activation time to activate the image sensor based on motion of a target element relative to the image sensor; activate the image sensor at the activation time; and activate the light source during the designated exposure time of the image sensor to produce a pulse having a preconfigured time duration that is less than the exposure time of the image sensor.

The system of any preceding clause wherein the activation time includes a repeating frame rate for activating the image sensor, and where the controller is configured to periodically pulse the light source in sync relative to the frame rate and the motion of the target element.

The system of any preceding clause wherein the controller is further configured to synchronize the activation of the light source with a vertical blanking time of the image sensor so as to capture the target element entirely within a single one of the one or more images.

The system of any preceding clause wherein the preconfigured time duration is determined as a function of a static resolution of a camera that includes the image sensor and a known maximum speed of the motion of the target element relative to the image sensor.

The system of any preceding clause wherein the designated exposure time is in a range of between 4 milliseconds and 8 milliseconds and the preconfigured time duration is in a range of between 0.25 milliseconds and 2.5 milliseconds.

The system of any preceding clause wherein the designated exposure time is in a range of between 4 milliseconds and 64 milliseconds and the preconfigured time duration is in a range of between 0.1 milliseconds and 4 milliseconds.

The system of any preceding clause further comprising a sensor configured to transmit a detection signal to the controller when the sensor detects movement within a sensing region of the sensor.

The system of any preceding clause wherein the movement the controller is configured to use to determine the activation time includes an average revolutions per minute of the target element determined by the controller from repeated receptions of the detection signal, and wherein the controller is configured to determine a time delay from receipt of the detection signal based on an average revolutions per minute associated with the target element and activate the light source following the time delay.

The system of any preceding clause wherein the movement the controller is configured to use to determine the activation time includes a known revolutions per minute of the target element, and wherein the controller is configured to determine a time delay from receipt of the detection signal based on the known revolutions per minute associated with the target element and activate the light source following the time delay.

The system of any preceding clause wherein the target element includes one or more airfoils within multiple stages of an engine, and wherein the sensor is configured to detect movement relative to a single common reference point for each of the multiple stages.

The system of any preceding clause wherein the sensor is selected from one of a switch, an inductive proximity sensor, an optical proximity sensor, a hall effect sensor, an electrical continuity sensor, and an ultrasonic sensor.

The system of any preceding clause wherein the motion the controller is configured to use to determine the activation time includes a known frequency and duration of a repeating and periodic movement of the target element relative to the image sensor, wherein the controller is configured to activate the light source based on a time delay as measured relative to activation of the image sensor and initiation of the repeating and periodic movement of the target element.

The system of any preceding clause wherein the light source is selected from one of a light emitting diode, an array of light emitting diodes, a xenon strobe light, a laser light source, and a fiberoptic transport.

A method for inspecting a target element, the method comprising: determining an activation time to activate an image sensor based on motion of a target element relative to the image sensor; activating, at the activation time, a plurality of light sensitive pixel elements of the image sensor for a designated exposure time to capture one or more images of a field of view of the image sensor; and activating a light source during the designated exposure time of the image sensor to produce a pulse having a preconfigured time duration that is less than the exposure time of the image sensor.

The method of any preceding clause further comprising synchronizing the activation of the light source with a vertical blanking time of the image sensor so as to capture the target element entirely within a single one of the one or more images.

The method of any preceding clause further comprising determining the preconfigured time duration as a function of a static resolution of a camera that includes the image sensor and a known maximum speed of the motion of the target element relative to the image sensor.

The method of any preceding clause further comprising: detecting motion within a sensing region of a sensor; receiving a detection signal from the sensor responsive to the detecting; and activating the light source after a time delay following receipt of the detection signal.

The method of any preceding clause further comprising: receiving a known frequency and duration of a repeating and periodic movement of the target element; determining the activation time from the known frequency and duration of the repeating and periodic movement; determining a time delay for activating the light source as measured relative to activation of the image sensor and initiation of the repeating and periodic movement of the target element; and activating the light source after the time delay.

The method of any preceding clause further comprising combining adjacent ones of the one or more images to generate a single composite image of the target element.

A method for calibrating a light pulse illumination time delay for an inspection system, the method comprising: activating, after a time delay, a light source to illuminate a field of view of an image sensor for a preconfigured time duration; initiating repeated activation of a plurality of light sensitive pixel elements of the image sensor for a designated exposure time to capture light sensitivity data from the field of view so as to capture a plurality of video frames; evaluating the plurality of video frames to determine whether the activating of the light source was synchronized with the plurality of video frames; and when the activating of the light source is not synchronized, identifying a proximate delay between the capture of the plurality of video frames and the activating of the light source and updating the time delay based on the proximate delay.

The method of any preceding clause further comprising when the activating of the light source is synchronized, saving a current value of the time delay as a calibrated time delay value for use in normal operation of the inspection system.

The systems or methods of any preceding clause wherein the static resolution of the camera is selected from one of 10 lp/mm at a distance of 30 mm from the camera to the target element, 11.2 lp/mm at a distance of 20 mm from the camera to the target element, and 22.5 lp/mm at a distance of 30 mm from the camera to the target element.

The systems or methods of any preceding clause wherein a maximum duration PW-MAX for the pulse width in milliseconds that replicates the static resolution of the camera at a specified working distance and minimum exposure time is defined as $1000/(2*R\text{-}CAM*TS)$, where R-CAM is the static resolution of the camera at the specific working distance in lp/mm and TS is the transverse speed of the target element relative to the camera in mm/s.

The systems or method of any preceding clause wherein an amount of light emitted by the light source is varied as a function of the preconfigured time duration for which the light source is activated.

The systems or methods of any preceding clause wherein an amount of light emitted by the light source L-OUT is defined as $L\text{-}CON*ET\text{-}MIN/PWD$, where L-CON is a continuous illumination in lux that produces ideal images at a hardware or resolution limited minimum exposure time (ET-MIN) of the camera and PWD is preconfigured time duration for which the light source is activated.

The systems or methods of any preceding clause wherein the plurality of light sensitive pixel elements are activated for the designated exposure time, in the discrete rows, and on a rolling basis.

The systems or methods of any preceding clause wherein the plurality of light sensitive pixel elements are simultaneously activated for the designated exposure time.

The systems or methods of any preceding clause wherein the motion of the target element relative to the image sensor includes one of movement of the target element relative to a stationary image sensor, movement of the image sensor relative to a stationary target element, and simultaneous movement of both the image sensor and the target element relative to each other. The systems or methods of any preceding clause wherein the relative movement includes lateral movement, transverse movement, movement in/out of a plane of view, and any combination thereof.

A computer-readable medium comprising computer-executable instructions, which, when executed by one or more processors of a controller for a pulse illumination imaging system, cause the controller to: determine an activation time to activate an image sensor based on relative motion between a target element and the image sensor; activate the image sensor at the activation time; and activate a light source during a designated exposure time of the image sensor to produce a pulse having a preconfigured time duration that is less than the designated exposure time of the image sensor.

A controller for a pulse illumination imaging system, the controller comprising: one or more non-transitory memory devices; and one or more processors configured to: determine an activation time to activate an image sensor based on relative motion between a target element and the image sensor; activate the image sensor at the activation time; and activate a light source during a designated exposure time of the image sensor to produce a pulse having a preconfigured time duration that is less than the designated exposure time of the image sensor.

A controller for a pulse illumination imaging system, the controller comprising: one or more non-transitory memory devices; and one or more processors configured to: determine an activation time to activate an image sensor based on relative motion between a target element and the image sensor; activate the image sensor at the activation time; and activate a light source during a designated exposure time of the image sensor to produce a pulse illumination with a pulse repetition frequency that is synced with a frame rate of the image sensor, and wherein the pulse illumination has a preconfigured time duration that is less than the designated exposure time of the image sensor.

What is claimed is:

1. A pulse illumination imaging system comprising:
   an image sensor having a plurality of light sensitive pixel elements that are activatable for a designated exposure time to capture one or more images of a field of view of the image sensor;
   a light source; and
   a controller configured to:
      determine an activation time to activate the image sensor based on motion of a target element relative to the image sensor;
      activate the image sensor at the activation time; and
      activate the light source during the designated exposure time of the image sensor to produce a pulse having a preconfigured time duration that is less than the designated exposure time of the image sensor.

2. The system of claim 1, wherein the activation time includes a repeating frame rate for activating the image sensor, and where the controller is configured to periodically pulse the light source in sync relative to the frame rate and the motion of the target element.

3. The system of claim 1, wherein the controller is further configured to synchronize the activation of the light source with a vertical blanking time of the image sensor so as to capture the target element entirely within a single one of the one or more images.

4. The system of claim 1, wherein the preconfigured time duration is determined as a function of a static resolution of a camera that includes the image sensor and a known maximum speed of the motion of the target element relative to the image sensor.

5. The system of claim 1, wherein the designated exposure time is in a range of between 4 milliseconds and 64 milliseconds and the preconfigured time duration is in a range of between 0.1 milliseconds and 4 milliseconds.

6. The system of claim 1, further comprising a sensor configured to transmit a detection signal to the controller when the sensor detects movement within a sensing region of the sensor.

7. The system of claim 6, wherein the movement the controller is configured to use to determine the activation time includes an average revolutions per minute of the target element determined by the controller from repeated receptions of the detection signal, and wherein the controller is configured to determine a time delay from receipt of the detection signal based on an average revolutions per minute associated with the target element and activate the light source following the time delay.

8. The system of claim 6, wherein the movement the controller is configured to use to determine the activation time includes a known revolutions per minute of the target element, and wherein the controller is configured to determine a time delay from receipt of the detection signal based on the known revolutions per minute associated with the target element and activate the light source following the time delay.

9. The system of claim 6, wherein the target element includes one or more airfoils within multiple stages of an engine, and wherein the sensor is configured to detect movement relative to a single common reference point for each of the multiple stages.

10. The system of claim 6 wherein the sensor is selected from one of a switch, an inductive proximity sensor, an optical proximity sensor, a hall effect sensor, an electrical continuity sensor, and an ultrasonic sensor.

11. The system of claim 1, wherein the motion the controller is configured to use to determine the activation time includes a known frequency and duration of a repeating and periodic movement of the target element relative to the image sensor, wherein the controller is configured to activate the light source based on a time delay as measured relative to activation of the image sensor and initiation of the repeating and periodic movement of the target element.

12. The system of claim 1, wherein the light source is selected from one of a light emitting diode, an array of light emitting diodes, a xenon strobe light, a laser light source, and a fiberoptic transport.

13. A method for inspecting a target element, the method comprising:
   determining an activation time to activate an image sensor based on motion of a target element relative to the image sensor;
   activating, at the activation time, a plurality of light sensitive pixel elements of the image sensor for a designated exposure time to capture one or more images of a field of view of the image sensor; and
   activating a light source during the designated exposure time of the image sensor to produce a pulse having a preconfigured time duration that is less than the designated exposure time of the image sensor.

14. The method of claim 13, further comprising synchronizing the activation of the light source with a vertical blanking time of the image sensor so as to capture the target element entirely within a single one of the one or more images.

15. The method of claim 13, further comprising determining the preconfigured time duration as a function of a static resolution of a camera that includes the image sensor and a known maximum speed of the motion of the target element relative to the image sensor.

16. The method of claim 13, further comprising:
   detecting motion within a sensing region of a sensor;
   receiving a detection signal from the sensor responsive to the detecting; and
   activating the light source after a time delay following receipt of the detection signal.

17. The method of claim 13, further comprising:
receiving a known frequency and duration of a repeating and periodic movement of the target element;
determining the activation time from the known frequency and duration of the repeating and periodic movement;
determining a time delay for activating the light source as measured relative to activation of the image sensor and initiation of the repeating and periodic movement of the target element; and
activating the light source after the time delay.

18. The method of claim 13, further comprising combining adjacent ones of the one or more images to generate a single composite image of the target element.

19. The method of claim 13, wherein the activation time includes a repeating frame rate for activating the image sensor, and the light source is periodically pulsed in sync relative to the frame rate and the motion of the target element.

20. The method of claim 13, wherein the target element includes one or more airfoils within multiple stages of an engine, and wherein a sensor is configured to detect movement relative to a single common reference point for each of the multiple stages.

* * * * *